United States Patent
Lunttila et al.

(10) Patent No.: US 10,721,757 B2
(45) Date of Patent: Jul. 21, 2020

(54) METHODS AND APPARATUSES FOR RESTRICTING USER EQUIPMENT AUTONOMOUS TRANSMISSIONS

(71) Applicant: Nokia Technologies Oy, Espoo (FI)

(72) Inventors: Timo Erkki Lunttila, Espoo (FI); Klaus Hugl, Vienna (AT)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/053,452

(22) Filed: Aug. 2, 2018

(65) Prior Publication Data

US 2019/0053261 A1 Feb. 14, 2019

Related U.S. Application Data

(60) Provisional application No. 62/543,560, filed on Aug. 10, 2017.

(51) Int. Cl.
| | |
|---|---|
| *H04W 72/12* | (2009.01) |
| *H04W 74/00* | (2009.01) |
| *H04W 72/04* | (2009.01) |
| *H04W 74/02* | (2009.01) |

(52) U.S. Cl.
CPC ... *H04W 72/1268* (2013.01); *H04W 72/0446* (2013.01); *H04W 74/006* (2013.01); *H04W 74/02* (2013.01)

(58) Field of Classification Search
CPC ............. H04W 72/0446; H04W 74/02; H04W 74/006; H04W 72/1268; H04W 72/12; H04W 72/04

USPC ......................................................... 370/329
See application file for complete search history.

(56) References Cited

U.S. PATENT DOCUMENTS

| | | | | |
|---|---|---|---|---|
| 10,028,302 | B2 * | 7/2018 | Au | H04L 5/0041 |
| 10,045,368 | B2 * | 8/2018 | Zeng | H04L 1/0003 |
| 10,271,350 | B2 * | 4/2019 | Zhang | H04L 1/1812 |
| 10,285,180 | B2 * | 5/2019 | Zeng | H04W 28/26 |
| 10,499,386 | B2 * | 12/2019 | Ying | H04L 5/0044 |
| 2014/0254544 | A1 | 9/2014 | Kar Kin Au et al. | |
| 2016/0270053 | A1 | 9/2016 | Zeng et al. | |
| 2017/0164390 | A1 | 6/2017 | Zeng et al. | |
| 2018/0167161 | A1 * | 6/2018 | Davydov | H04L 1/0011 |
| 2018/0323909 | A1 * | 11/2018 | Ying | H04L 1/1812 |
| 2019/0044663 | A1 * | 2/2019 | Rosa | H04L 1/1816 |
| 2019/0053211 | A1 * | 2/2019 | Ying | H04W 72/044 |
| 2019/0082450 | A1 * | 3/2019 | Ying | H04W 72/1268 |
| 2019/0124683 | A1 * | 4/2019 | Zhang | H04L 1/1812 |
| 2019/0158240 | A1 * | 5/2019 | Li | H04L 1/1861 |

(Continued)

FOREIGN PATENT DOCUMENTS

WO 2017/039564 A1 3/2017

OTHER PUBLICATIONS

Extended European Search Report received for corresponding European Patent Application No. 18186459.6, dated Dec. 7, 2018, 9 pages.

(Continued)

*Primary Examiner* — Man U Phan
(74) *Attorney, Agent, or Firm* — Squire Patton Boggs (US) LLP

(57) ABSTRACT

Systems, methods, apparatuses, and computer program products for restricting UE autonomous transmissions are provided.

17 Claims, 4 Drawing Sheets

(56) References Cited

U.S. PATENT DOCUMENTS

2019/0357243 A1* 11/2019 Takeda ................ H04W 72/04

OTHER PUBLICATIONS

"UL Grant-Free Transmission for URLLC", 3GPP TSG RAN WG1 NR Ad-Hoc#2, R1-1710601, Lenovo, Agenda Item: 5.1.3.3.3, Jun. 27-30, 2017, 3 pages.

"UL Grant-Free Transmissions: Resource Configuration", 3GPP TSG RAN WG1 NR Ad-Hoc#2, R1-1710568, Intel Corporation, Agenda item: 5.1.3.3.3, Jun. 27-30, 2017, pp. 1-5.

"HARQ Design for UL Grant-Free URLLC Transmission", 3GPP TSG RAN WG1 Meeting #88, R1-1702667, Lenovo, Agenda Item: 8.1.3.4.4, Feb. 13-17, 2017, 3 pages.

"New Work Item on Enhancements to LTE Operation in Unlicensed Spectrum", 3GPP TSG RAN Meeting #75, RP-170835, Agenda Item: 10.1.1, Nokia, Mar. 6-9, 2017, 5 pages.

"On Support of Grant-Free and Grant-Based Transmission for UL URLLC", 3GPP TSG RAN WG1 NR Ad-Hoc#2, R1-1710834, Agenda Item: 5.1.3.3.2, MediaTek Inc, Jun. 27-30, 2017, 4 pages.

"Grant-Free and Grant-Based UL Transmissions", 3GPP TSG RAN WG1 NR Ad Hoc, R1-1710724, Agenda Item: 5.1.3.3.3, Samsung, Jun. 27-30, 2017, 4 pages.

"Discussion on UL multiplexing of Grant-Based eMBB and Grant-Free URLLC", 3GPP TSG RAN WG1 NR Ad Hoc Meeting, R1-1709988, Agenda Item: 5.1.3.3.7.2, Huawei, Jun. 27-30, 2017, 6 pages.

"Discussion on Overall WI and SI of R15", 3GPP TSG RAN Meeting #75, RP-170385, Agenda Item: 9.1, ZTE, Mar. 6-9, 2017, 5 pages.

* cited by examiner

METHODS AND APPARATUSES FOR RESTRICTING USER EQUIPMENT AUTONOMOUS TRANSMISSIONS

BACKGROUND

Field

Embodiments of the invention generally relate to wireless or cellular communications networks, such as, but not limited to, the Universal Mobile Telecommunications System (UMTS) Terrestrial Radio Access Network (UTRAN), Long Term Evolution (LTE) Evolved UTRAN (E-UTRAN), LTE-Advanced (LTE-A), LTE-A Pro, and/or 5G radio access technology or new radio access technology (NR). Some embodiments may generally relate to LTE operation on unlicensed carriers, for example.

Description of the Related Art

Universal Mobile Telecommunications System (UMTS) Terrestrial Radio Access Network (UTRAN) refers to a communications network including base stations, or Node Bs, and for example radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS). In case of E-UTRAN (Evolved-UTRAN), the air interface design, protocol architecture and multiple-access principles are new compared to that of UTRAN, and no RNC exists and radio access functionality is provided by an evolved Node B (eNodeB or eNB) or many eNBs. Multiple eNBs are involved for a single UE connection, for example, in case of Coordinated Multipoint Transmission (CoMP) and in dual connectivity.

Long Term Evolution (LTE) or E-UTRAN improved efficiency and services, offers lower costs, and provides new spectrum opportunities, compared to the earlier generations. In particular, LTE is a 3GPP standard that provides for uplink peak rates of at least, for example, 75 megabits per second (Mbps) per carrier and downlink peak rates of at least, for example, 300 Mbps per carrier. LTE supports scalable carrier bandwidths from 20 MHz down to 1.4 MHz and supports both Frequency Division Duplexing (FDD) and Time Division Duplexing (TDD). Carrier aggregation or said dual connectivity further allows operating on multiple component carriers at the same time hence multiplying the performance such as data rates per user.

As mentioned above, LTE may also improve spectral efficiency in networks, allowing carriers to provide more data and voice services over a given bandwidth. Therefore, LTE is designed to fulfill the needs for high-speed data and media transport in addition to high capacity voice support. Advantages of LTE include, for example, high throughput, low latency, FDD and TDD support in the same platform, an improved end-user experience, and a simple architecture resulting in low operating costs.

Certain further releases of 3GPP LTE (e.g., LTE Rel-10, LTE Rel-11) are targeted towards international mobile telecommunications advanced (IMT-A) systems, referred to herein for convenience simply as LTE-Advanced (LTE-A).

LTE-A is directed toward extending and optimizing the 3GPP LTE radio access technologies. A goal of LTE-A is to provide significantly enhanced services by means of higher data rates and lower latency with reduced cost. LTE-A is a more optimized radio system fulfilling the international telecommunication union-radio (ITU-R) requirements for IMT-Advanced while maintaining backward compatibility. One of the key features of LTE-A, introduced in LTE Rel-10, is carrier aggregation, which allows for increasing the data rates through aggregation of two or more LTE carriers. The next releases of 3GPP LTE (e.g. LTE Rel-12, LTE Rel-13, LTE Rel-14, LTE Rel-15) are targeted for further improvements of specialized services, shorter latency and meeting requirements approaching the 5G.

$5^{th}$ generation (5G) or new radio (NR) wireless systems refer to the next generation (NG) of radio systems and network architecture. 5G is also known to appear as the IMT-2020 system. It is estimated that 5G will provide bitrates on the order of 10-20 Gbit/s or higher. 5G will support at least enhanced mobile broadband (eMBB) and ultra-reliable low-latency-communication (URLLC). 5G is also expected to increase network expandability up to hundreds of thousands of connections. The signal technology of 5G is anticipated for greater coverage as well as spectral and signaling efficiency. 5G is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. In 5G or NR, the Node B or eNB may be referred to as a next generation Node B (gNB).

SUMMARY

In a first aspect thereof the exemplary embodiments of this invention provide a method that comprises receiving a first configuration for grantless uplink subframes from a network node via radio resource control signaling as a bitmap indicating for one or more subframes whether or not grantless uplink transmissions is allowed; receiving a second configuration for determining additional restrictions for grantless uplink subframes; and determining from the received second configuration when grantless uplink transmission is not allowed for at least one grantless uplink subframe.

In a further aspect thereof the exemplary embodiments of this invention provide an apparatus that comprises at least one data processor and at least one memory that includes computer program code. The at least one memory and computer program code are configured, with the at least one data processor, to cause the apparatus, at least to receive a first configuration for grantless uplink subframes from a network node via radio resource control signaling as a bitmap indicating for one or more subframes whether or not grantless uplink transmissions is allowed; receive a second configuration for determining additional restrictions for grantless uplink subframes; and determine from the received second configuration when grantless uplink transmission is not allowed for at least one grantless uplink subframe.

In another aspect thereof the exemplary embodiments of this invention provide an apparatus that comprises at least one data processor and at least one memory that includes computer program code. The at least one memory and computer program code are configured, with the at least one data processor, to cause the apparatus, at least to signal a first configuration for grantless uplink subframes to at least one user equipment via radio resource control signaling as a bitmap indicating for one or more subframes whether or not grantless uplink transmissions is allowed; and signal a second configuration for the user equipment to determine additional restrictions regarding when grantless uplink transmission is not allowed.

BRIEF DESCRIPTION OF THE DRAWINGS

For proper understanding of the invention, reference should be made to the accompanying drawings, wherein.

DETAILED DESCRIPTION

Figure 1:
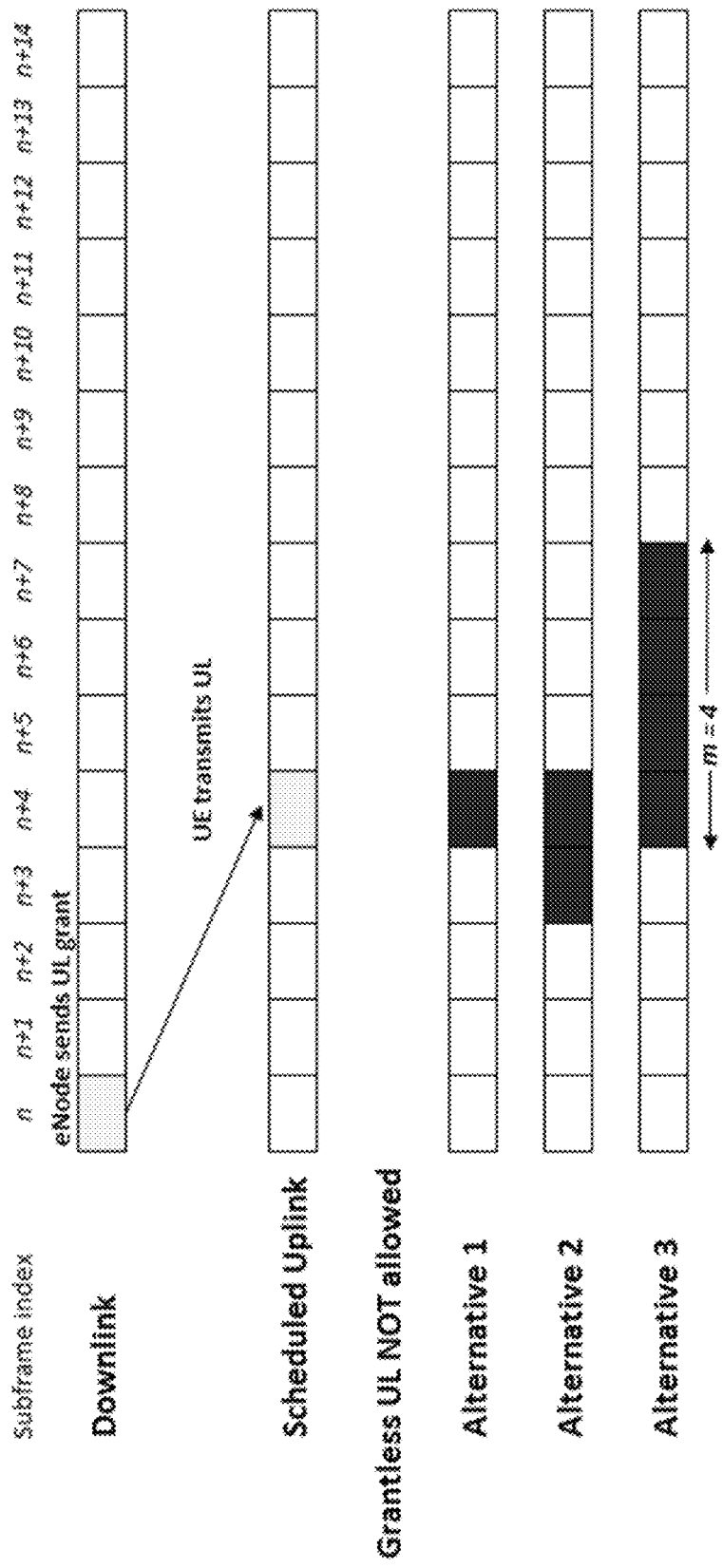
FIG. 1 illustrates a block diagram depicting alternatives for grantless uplink transmission, according to some embodiments.

It will be readily understood that the components of the invention, as generally described and illustrated in the figures herein, may be arranged and designed in a wide variety of different configurations. Thus, the following detailed description of the embodiments of systems, methods, apparatuses, and computer program products relating to restricting UE autonomous transmissions, as represented in the attached figures and described below, is not intended to limit the scope of the invention but is representative of selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

Certain embodiments relate to LTE-Advanced Pro systems that will be part of 3GPP LTE Release-15. More specifically, one embodiment relates LTE operation on unlicensed carriers.

A 3GPP LTE Release-15 Work Item (WI) entitled "Enhancements to LTE operation in unlicensed spectrum" includes the objectives of specifying support for multiple starting and ending positions in a subframe for uplink (UL) and downlink (DL) on secondary cell (SCell) with Frame structure type 3, and specifying, if needed, support for autonomous uplink access with Frame Structure type 3 considering solutions from the L2 latency reduction work item. The "Enhancements to LTE operation in unlicensed spectrum" WI only supports Licensed Assisted Access (LAA), where the Primary Cell (PCell) in carrier aggregation must be located on a licensed spectrum, aggregated with one or more LAA Secondary Cells (SCells) on unlicensed spectrum.

LTE standalone operation on unlicensed spectrum means that eNodeB/UE air interface relies solely on unlicensed spectrum without any carrier on licensed spectrum. LTE-based technology supporting networks' stand-alone operation on unlicensed carriers is currently developed by MulteFire Alliance (MFA). In addition to licensed band LTE or Licensed Assisted Access (LAA), certain embodiments may also be relevant to MulteFire. In MFA, the term "Grantless Uplink" (GUL) is often used when referring to autonomous UL access.

Some embodiments focus on autonomous uplink access with LTE Frame Structure type 3. For example, certain embodiments provide solutions for the network to ensure that autonomous UL transmission do not occur at unwanted times.

GUL transmissions, which are planned to be supported on unlicensed carriers/bands, are in principle UE-autonomous, with certain restrictions provided by the eNodeB configuration. As an example, in an embodiment, the eNodeB may provide to the UE an RRC configured bitmap indicating the subframes where GUL transmissions may be allowed. At the same time, the eNB may want schedule physical uplink shared channel (PUSCH) on licensed or unlicensed carriers. Moreover, in Licensed Assisted Access (LAA), physical uplink control channel (PUCCH) transmissions (including HARQ-ACK, Channel state information, Scheduling Request) may occur on licensed carriers.

Due to the autonomous nature of GUL transmissions, the simultaneous transmissions of scheduled (either dynamically or semi-persistently) and Grantless UL signals may often occur unexpectedly as the eNodeB cannot have certainty of whether UE performs a GUL transmission or not until it has taken place. This may result in issues with uplink power control, as the transmit power may need to be split between the scheduled and the GUL transmissions.

In some occasions, guaranteeing sufficient coverage for the critical scheduled licensed band signals might be compromised due to power back-off that the UE would need to do because of GUL. Moreover, when GUL and scheduled uplink (SUL) transmission occur on the same carrier, there may be a possibility for confusion in the selection of UL HARQ-process identity (i.e., the same ID could be chosen for both GUL and SUL).

In MFA Release 1.1 GUL, scheduled transmissions occur naturally within the channel occupancy time acquired by the eNodeB, and the UEs know that scheduled uplink transmission take priority over GUL based on a common physical downlink control channel (PDCCH) message (CPDCCH) which indicates UL subframes within a channel occupancy time. However, in LAA, scheduled UL transmissions may happen at any point in time, and due to cross-carrier scheduling from licensed to unlicensed carriers, transmission outside of transmission opportunities (TXOPs) acquired by the eNodeB can also occur rather often.

Another problem is that in the case of carrier aggregation (CA) of unlicensed Component Carriers (CCs) (in either LAA or MFA), if a UE is scheduled in UL on one carrier (e.g., Carrier A) in subframe n, a GUL transmission on another carrier (e.g., Carrier B) in subframe n−1 or in subframe n could in some cases prevent the UE from performing the necessary channel access procedure on Carrier A (i.e., Listen-Before-Talk) and hence also block the UL transmission for Carrier A.

Therefore, certain embodiments provide a solution for how to mitigate at least the above-discussed unwanted events with simultaneous GUL and Scheduled UL (SUL, e.g., on licensed carrier) transmissions.

According to one embodiment, a set of rules may be defined for when autonomous UL transmissions are allowed. These set of rules may be an additional limitation or restrictions on top of the RRC configured time instances when GUL transmissions may in principle occur.

An embodiment may make the GUL transmissions of a given UE conditional on the fact that (dynamically or persistently) scheduled UL transmissions are not present for that UE in a predefined time window. This can be beneficial, since scheduled UL transmission are more likely to succeed than contention based GUL transmissions, and once the eNodeB has received a scheduled transmission along with a buffer status report (BSR) it can anyhow start scheduling UL resources for the UE, if necessary.

In one embodiment, a time window may be defined, during which GUL transmissions are not allowed, even if the RRC configured bitmap would indicate a given subframe as eligible for GUL transmission. More specifically, according to an embodiment, the time window may be dependent on the time when the UE has been scheduled to transmit either PUSCH or PUCCH.

According to certain embodiments, the time window for when GUL transmission is not allowed may be according to one or more of the following alternatives: 1) Alt 1: the same subframe as a scheduled UL transmission; 2) Alt 2: in the previous and the same subframe as a scheduled UL transmission; 3) Alt 3: in m subframes following a scheduled UL transmission, where the value of m could be either predetermined (fixed in the standards) or configurable variable; and/or 4) Alt 4: in m subframes following a correctly received scheduled UL transmission (an incorrectly received scheduled UL transmission would not prevent GUL transmissions), where the value of m could be either predetermined (fixed in the standards) or configurable variable.

FIG. 1 illustrates an example block diagram depicting the alternatives 1, 2, and 3 discussed above. In an embodiment, the eNodeB may send an uplink grant for the UE using, e.g., PDCCH or EPDCCH in subframe n, and the corresponding scheduled UL transmission shall take place four subframes later in subframe n+4. In Alt 1, GUL is not allowed in a subframe where a scheduled UL transmission takes place (subframe n+4). It is noted that, although FIG. 1 illustrates the case when the UL transmission is scheduled with an UL grant, the same rule may also apply for UL transmissions that are configured more statically (e.g., occur periodically based on RRC configuration), or that are triggered as a response to a DL data transmission (such as HARQ-ACKs).

In Alt 2, GUL is not allowed in a subframe where a scheduled or configured UL transmission takes place (subframe n+4) and GUL transmissions are not allowed also in the subframe before the one where scheduled UL transmission occurs (subframe n+3). This can be beneficial, for example, in the case of carrier aggregation, where different carrier may have slightly different timing, resulting in overlap of different subframes. Alt 3 provides another option, where a scheduled UL transmission effectively cancels the GUL configuration for a few (m=4 in this example) subframes.

It should be noted that further combinations of the depicted alternatives are also possible, such as combining Alt 2 and Alt 3 such that the window starts before the subframe where the scheduled transmission takes place, and ends sometime after that one.

Figure 2:
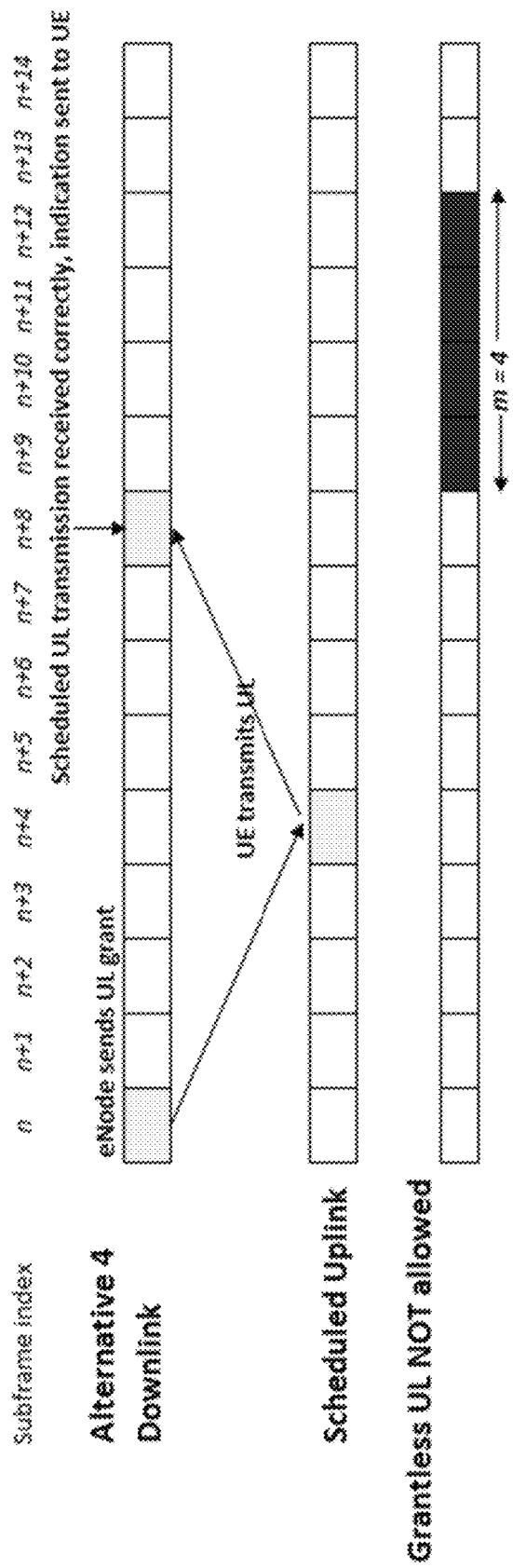
FIG. 2 illustrates a block diagram depicting alternatives for grantless uplink transmission, according to other embodiments.

FIG. 2 illustrates another, different approach for determining when GUL transmissions are not allowed to occur according to Alt 4. In the example of FIG. 2, the time window is not determined from the time of a scheduled UL transmission, but instead from the time when the eNodeB provides a positive acknowledgement for the scheduled UL transmission, indicating that it has been correctly received. A benefit of this approach is that it allows for using GUL for retransmissions of scheduled UL transmissions that have not been received correctly.

In certain embodiments, the above-referenced scheduled UL transmission may be restricted to occur on the same unlicensed carrier as the GUL transmission, or on the same (unlicensed) band as the GUL transmission. Alternatively, in an embodiment, a scheduled UL transmission on any carrier may cause a GUL transmission to be forbidden.

According to one embodiment, a scheduled UL transmission which does not take place due to, for example, failing channel access procedure will cancel the time window where GUL is not allowed. For instance, if the UE fails to transmit a scheduled UL transmission in subframe n+4 (due to e.g. unlicensed carrier being occupied by another node), GUL transmissions may be allowed in subframe n+5, etc.

A further embodiment may include making the rules of disallowing GUL transmission channel specific. As one example, simultaneous transmission of GUL and periodic Channel State Information (CSI) could be allowed, or periodic CSI could even be dropped in the case of a GUL transmission. In other words, GUL transmission may be given a higher priority than, e.g., periodic CSI or sounding reference signal (SRS). On the other hand, scheduled PUSCH transmission and HARQ-ACK transmissions may have a higher priority than GUL, and in such cases the GUL transmissions would not be allowed.

In other embodiments, further complementary rules may be defined for the case of carrier aggregation of unlicensed carriers (LAA or MulteFire). For example, in an example embodiment, a UE is not allowed to start GUL on one carrier if that would prevent it from performing LBT for a scheduled transmission on another (or the same) carrier. This restriction may be beneficial since a UE cannot typically perform channel access procedure successfully when it is transmitting on any unlicensed carrier. Alternatively, in another embodiment, the UE may puncture the end of the GUL subframe prior to the subframe where the scheduled transmission should occur to make room for channel access procedure (also known as listen-before-talk procedure).

Certain embodiments may be realized based on the following signaling between an eNodeB and UE. In an embodiment, the UE may receive a configuration for possible GUL subframes from the eNodeB. This may be received, for example, via RRC signalling as a bitmap where each bit set to "1" corresponds to a subframe where GUL transmissions may be allowed. Optionally (unless always enabled), the UE may receive, from the eNodeB, a configuration for determining the additional restrictions for GUL subframes. For example, this configuration for determining the additional restrictions for GUL subframes may correspond to Alt 1, Alt 2, Alt 3, and/or Alt 4 discussed above, including possibly the value of parameter m.

In some embodiments, the configuration may also be channel specific, such that the GUL dropping can be separately configured, e.g., for the cases of scheduled and semi-persistent PUSCH transmissions, as well as, e.g., HARQ-ACK, periodic CSI, and SRS transmission on PUCCH. According to certain embodiments, the configuration may also be cell (i.e., carrier) or cell group specific, such that scheduled transmissions on some carrier may not result in GUL transmissions being forbidden, where as scheduled transmissions on some other carriers may cause GUL to be dropped. Whether GUL transmissions are to be dropped or not, may also depend on whether they occupy the whole carrier (e.g. 100 Physical resource blocks, PRBs) or not, or whether the GUL transmission would coincide with the UL subframes in an eNodeB-acquired transmission opportunity (TXOP) on an unlicensed carrier.

In an embodiment, the UE may determine that UL signals are scheduled to be transmitted in a subframe, and based on the previous step, determine whether GUL transmission is allowed in that subframe, or in subframes before or after that.

Figure 3A:
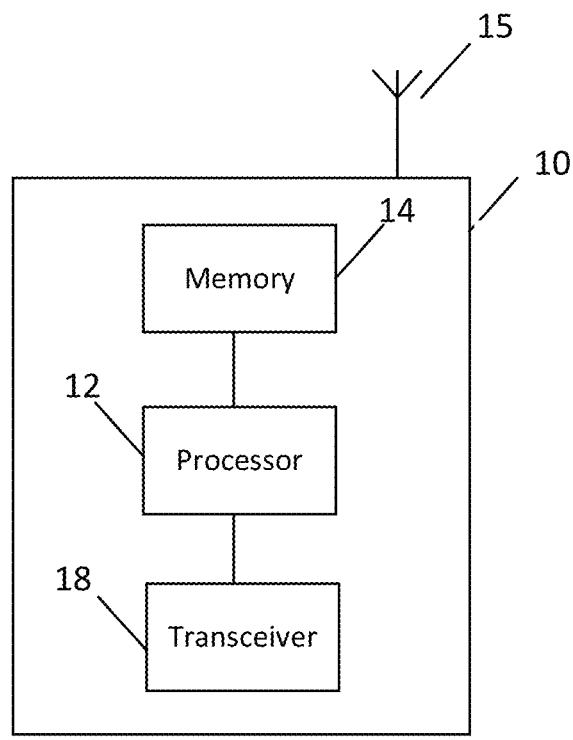
FIG. 3a illustrates an example block diagram of an apparatus, according to one embodiment.

FIG. 3a illustrates an example of an apparatus 10 according to an embodiment. In an embodiment, apparatus 10 may be a node, host, or server in a communications network or serving such a network. For example, apparatus 10 may be a base station, a Node B, an evolved Node B (eNB), 5G Node B or access point, next generation Node B (NG-NB or gNB), WLAN access point, mobility management entity (MME), or subscription server associated with a radio access network, such as a GSM network, LTE network, 5G or NR.

It should be understood that apparatus 10 may be comprised of an edge cloud server as a distributed computing system where the server and the radio node may be stand-alone apparatuses communicating with each other via a radio path or via a wired connection, or they may be located in a same entity communicating via a wired connection. It should be noted that one of ordinary skill in the art would understand that apparatus 10 may include components or features not shown in FIG. 3a.

As illustrated in FIG. 3a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 3a, multiple processors may be utilized according to other embodiments. For example, it should be understood that, in certain embodiments, apparatus 10 may include two or more processors that may form a multiprocessor system (i.e., in this case processor 12 represents a multiprocessor) that may support multiprocessing. In certain embodiments, the multiprocessor system may be tightly coupled or loosely coupled (e.g., to form a computer cluster).

Processor 12 may perform functions associated with the operation of apparatus 10 which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink) As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

In certain embodiments, apparatus 10 may be a network node or RAN node, such as a base station, access point, Node B, eNB, 5G or new radio Node B (gNB) or access point, WLAN access point, or the like. According to certain embodiments, apparatus 10 may be controlled by memory 14 and processor 12 to perform the functions associated with any of the embodiments described herein.

In one embodiment, apparatus 10 may be controlled by memory 14 and processor 12 to signal a configuration for possible GUL subframes to at least one UE. The configuration may be signaled via RRC signalling, for example, as a bitmap where each bit set to "1" corresponds to a subframe where GUL transmissions may be allowed. In another example, the bitmap may be set such that each bit set to "0" corresponds to a subframe where GUL transmissions are allowed, and bits set to "1" mean that GUL transmissions are not allowed. According to an embodiment, apparatus 10 may also be controlled by memory 14 and processor 12 to signal a configuration for determining the additional restrictions for GUL subframes. For example, the configuration for determining when GUL transmission is not allowed may be the same subframe as a scheduled UL transmission (Alt 1), may be in the previous and the same subframe as a scheduled UL transmission (Alt 2), may be in m subframes following a scheduled UL transmission, where the value of m could be either predetermined (fixed in the standards) or configurable variable (Alt 3), and/or may be in m subframes following a correctly received scheduled UL transmission (an incorrectly received scheduled UL transmission would not prevent GUL transmissions), where the value of m could be either predetermined (fixed in the standards) or configurable variable (Alt 4).

In certain embodiments, the configuration that apparatus 10 signals to the UE(s) may also be channel specific, such that the GUL dropping can be separately configured, e.g., for the cases of scheduled and semi-persistent PUSCH transmissions, as well as, e.g., HARQ-ACK, periodic CSI, and SRS transmission on PUCCH. In other embodiments, the configuration that apparatus 10 signals to the UE(s) may also be cell (i.e., carrier) or cell group specific, such that scheduled transmissions on some carrier may not result in GUL transmissions being forbidden, where as scheduled transmissions on some other carriers may cause GUL to be dropped. In an embodiment, whether GUL transmissions are to be dropped or not, may also depend on whether they occupy the whole carrier (e.g. 100 Physical resource blocks, PRBs) or not, or whether the GUL transmission would coincide with the UL subframes in an eNodeB-acquired transmission opportunity (TxOP) on an unlicensed carrier.

Figure 3B:
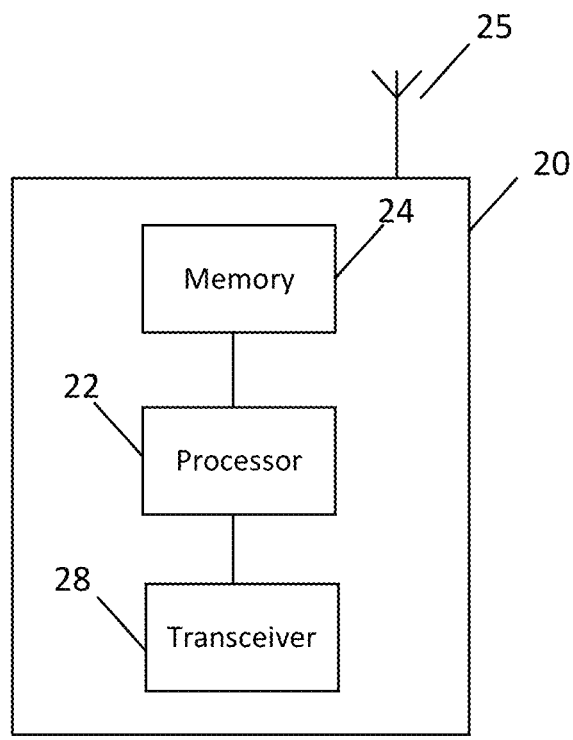
FIG. 3b illustrates an example block diagram of an apparatus, according to another embodiment.

FIG. 3b illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device or NB-IoT device, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, and the like), one or more radio access components (for example, a modem, a transceiver, and the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and any other radio access technologies. It should be noted that one of ordinary skill in the art would understand that apparatus 20 may include components or features not shown in FIG. 3b.

As illustrated in FIG. 3b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 3b, multiple processors may be utilized according to other embodiments. For example, it should be understood that, in certain embodiments, apparatus 20 may include two or more processors that may form a multiprocessor system (i.e., in this case processor 22 represents a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, without limitation, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 24 can be comprised of any combination of random access memory (RAM), read only memory (ROM), static storage such as a magnetic or optical disk, or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to one embodiment, apparatus 20 may be a UE, mobile device, mobile station, ME, IoT device and/or NB-IoT device, for example. According to certain embodiments, apparatus 20 may be controlled by memory 24 and processor 22 to perform the functions associated with embodiments described herein. For example, in some embodiments, apparatus 20 may be configured to perform one or more of the processes depicted in any of the flow charts or signaling diagrams described herein.

According to one embodiment, apparatus 20 may be controlled by memory 24 and processor 22 to receive a configuration for possible GUL subframes from an eNodeB. In an embodiment, the configuration may be received via RRC signalling, for example as a bitmap where each bit set to "1" corresponds to a subframe where GUL transmissions may be allowed. Optionally, in an embodiment, apparatus 20 may also be controlled by memory 24 and processor 22 to receive a configuration for determining the additional restrictions for GUL subframes. For example, the configuration for determining when GUL transmission is not allowed may be the same subframe as a scheduled UL transmission (Alt 1), may be in the previous and the same subframe as a scheduled UL transmission (Alt 2), may be in m subframes following a scheduled UL transmission, where the value of m could be either predetermined (fixed in the standards) or configurable variable (Alt 3), and/or may be in m subframes following a correctly received scheduled UL transmission (an incorrectly received scheduled UL transmission would not prevent GUL transmissions), where the value of m could be either predetermined (fixed in the standards) or configurable variable (Alt 4).

In certain embodiments, the configuration that apparatus 20 receives from the eNodeB may also be channel specific, such that the GUL dropping can be separately configured, e.g., for the cases of scheduled and semi-persistent PUSCH transmissions, as well as, e.g., HARQ-ACK, and transmissions configured to happen periodically such as CSI, and SRS transmission on PUCCH. In other embodiments, the configuration that apparatus 20 receives may also be cell (i.e., carrier) or cell group specific, such that scheduled transmissions on some carrier may not result in GUL transmissions being forbidden, where as scheduled transmissions on some other carriers may cause GUL to be dropped. In an embodiment, whether GUL transmissions are to be dropped or not, may also depend on whether they occupy the whole carrier (e.g. 100 Physical resource blocks, PRBs) or not, or whether the GUL transmission would coincide with the UL subframes in an eNodeB-acquired transmission opportunity (TxOP) on an unlicensed carrier.

In an embodiment, apparatus 20 may also be controlled by memory 24 and processor 22 to determine that UL signals are scheduled or configured to be transmitted in a subframe, and based on the previous step (e.g., based on the received configuration of possible GUL subframes), to determine whether GUL transmission is allowed in that subframe, or subframes before or after that.

In another embodiment, apparatus 20 may be controlled by memory 24 and processor 22 to determine that a positive HARQ acknowledgement for a PUSCH transmission has been received in a subframe, and based on the previous step (e.g., based on the received configuration of possible GUL subframes), to determine whether GUL transmission is allowed in subframes after that.

Figure 4A:
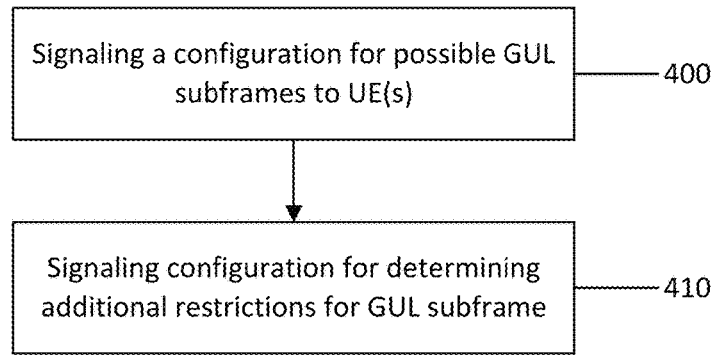
FIG. 4a illustrates an example flow diagram of a method, according to one embodiment.

FIG. 4a illustrates an example flow diagram of a method, according to one embodiment. The method may be performed by a network node, such as a base station, eNB, gNB, or access node, for example. The method of FIG. 4a may include, at 400, signaling a configuration for possible GUL subframes to at least one UE. The signaling may include signaling the configuration via RRC signalling, for example, as a bitmap where each bit set to "1" corresponds to a subframe where GUL transmissions may be allowed. According to an embodiment, the method may also include, at 410, signaling a configuration for determining the additional restrictions for GUL subframes. For example, the configuration for determining when GUL transmission is not allowed may be the same subframe as a scheduled UL transmission (Alt 1), may be in the previous and the same subframe as a scheduled UL transmission (Alt 2), may be in m subframes following a scheduled UL transmission, where the value of m could be either predetermined (fixed in the standards) or configurable variable (Alt 3), and/or may be in m subframes following a correctly received scheduled UL transmission (an incorrectly received scheduled UL transmission would not prevent GUL transmissions), where the value of m could be either predetermined (fixed in the standards) or configurable variable (Alt 4).

In certain embodiments, the configuration signaled to the UE(s) may also be channel specific, such that the GUL transmission dropping can be separately configured, e.g., for the cases of scheduled and semi-persistent PUSCH transmissions, as well as, e.g., HARQ-ACK, periodic CSI, and SRS transmission on PUCCH. In other embodiments, the configuration signaled to the UE(s) may also be cell (i.e., carrier) or cell group specific, such that scheduled transmissions on some carrier may not result in GUL transmissions being forbidden, where as scheduled transmissions on some other carriers may cause GUL transmissions to be dropped. In an embodiment, whether GUL transmissions are to be dropped or not, may also depend on whether they occupy the whole carrier (e.g. 100 Physical resource blocks, PRBs) or not, or whether the GUL transmission would coincide with the UL subframes in an eNodeB-acquired transmission opportunity (TxOP) on an unlicensed carrier.

Figure 4B:
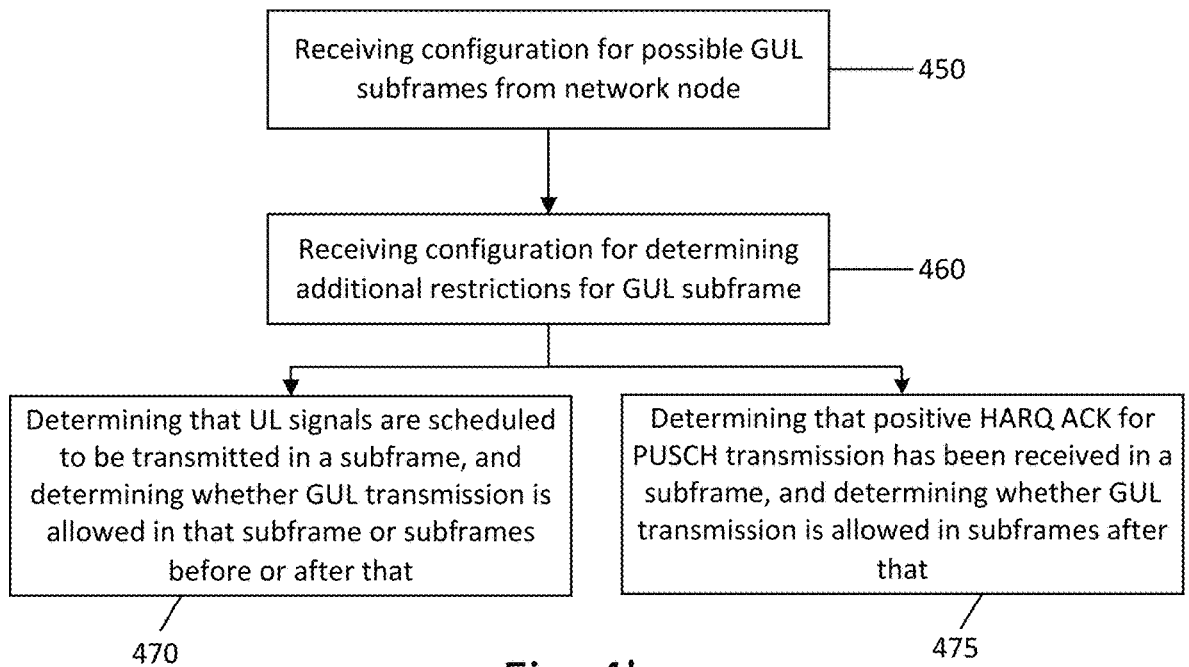
FIG. 4b illustrates an example flow diagram of a method, according to another embodiment.

FIG. 4b illustrates an example flow diagram of a method, according to one embodiment. The method may be performed by a UE or mobile station, for example. In an embodiment, the method may include, at 450, receiving a configuration for possible GUL subframes from an eNodeB. In an embodiment, the configuration may be received via RRC signalling, for example as a bitmap where each bit set to "1" corresponds to a subframe where GUL transmissions may be allowed. Optionally, in an embodiment, the method may also include, at 460, receiving a configuration for determining the additional restrictions for GUL subframes. For example, the configuration for determining when GUL transmission is not allowed may be the same subframe as a scheduled UL transmission (Alt 1), may be in the previous and the same subframe as a scheduled UL transmission (Alt 2), may be in m subframes following a scheduled UL transmission, where the value of m could be either predetermined (fixed in the standards) or configurable variable (Alt 3), and/or may be in m subframes following a correctly received scheduled UL transmission (an incorrectly received scheduled UL transmission would not prevent GUL transmissions), where the value of m could be either predetermined (fixed in the standards) or configurable variable (Alt 4).

In certain embodiments, the configuration received from the eNodeB may also be channel specific, such that the GUL dropping can be separately configured, e.g., for the cases of scheduled and semi-persistent PUSCH transmissions, as well as, e.g., HARQ-ACK, periodic CSI, and SRS transmission on PUCCH. In other embodiments, the configuration received may also be cell (i.e., carrier) or cell group specific, such that scheduled transmissions on some carrier may not result in GUL transmissions being forbidden, where as scheduled transmissions on some other carriers may cause GUL to be dropped. In an embodiment, whether GUL transmissions are to be dropped or not, may also depend on whether they occupy the whole carrier (e.g. 100 Physical resource blocks, PRBs) or not, or whether the GUL transmission would coincide with the UL subframes in an eNodeB-acquired transmission opportunity (TxOP) on an unlicensed carrier.

In an embodiment, the method may also include, at 470, determining that UL signals are scheduled to be transmitted in a subframe, and based on the previous step 460, determining whether GUL transmission is allowed in that subframe, or subframes before or after that.

In another alternative embodiment, the method may also include, at 475, determining that a positive HARQ acknowledgement for a PUSCH transmission has been received in a subframe, and based on the previous step 460, determining whether GUL transmission is allowed in subframes after that.

In view of the above, embodiments of the invention provide several technical effects and/or improvements and/or advantages. For example, certain embodiments allow for the eNodeB to dynamically control when the UE may perform autonomous transmissions. As such, embodiments are able to mitigate the issues related to, e.g., power control when both scheduled and GUL transmission might occur simultaneously. Additionally, disallowing simultaneous scheduled and GUL transmissions can simplify UE and eNodeB implementation. Embodiments described herein can be easily implemented in technical standards and in devices, such as UEs and eNodeBs according to certain rules. As a result, certain embodiments can improve performance and throughput of devices and network nodes including, for example, base stations, eNBs, gNBs and/or UEs. Accordingly, the use of embodiments of the invention result in improved functioning of communications networks and their nodes.

In some embodiments, the functionality of any of the methods, processes, signaling diagrams, or flow charts described herein may be implemented by software and/or computer program code or portions of code stored in memory or other computer readable or tangible media, and executed by a processor.

In certain embodiments, an apparatus may be included or be associated with at least one software application, module, unit or entity configured as arithmetic operation(s), or as a program or portions of it (including an added or updated software routine), executed by at least one operation processor. Programs, also called computer program products or computer programs, including software routines, applets and macros, may be stored in any apparatus-readable data storage medium and include program instructions to perform particular tasks.

A computer program product may comprise one or more computer-executable components which, when the program is run, are configured to carry out embodiments described herein. The one or more computer-executable components may include at least one software code or portions of code. Modifications and configurations required for implementing the functionality of an embodiment may be performed as routine(s), which may be implemented as added or updated software routine(s). In some embodiments, software routine(s) may be downloaded into the apparatus.

Software or a computer program code or portions of code may be in a source code form, object code form, or in some intermediate form, and may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and/or software distribution package, for example. Depending on the processing power needed, the computer program may be executed in a single electronic digital device or it may be distributed amongst a number of devices or computers. The computer readable medium or computer readable storage medium may be a non-transitory medium.

In other embodiments, the functionality may be performed by hardware, for example through the use of an application specific integrated circuit (ASIC), a programmable gate array (PGA), a field programmable gate array (FPGA), or any other combination of hardware and software. In yet another embodiment, the functionality may be implemented as a signal, a non-tangible means that can be carried by an electromagnetic signal downloaded from the Internet or other network.

According to an embodiment, an apparatus, such as a node, device, or a corresponding component, may be configured as a computer or a microprocessor, such as single-chip computer element, or as a chipset, including at least a memory for providing storage capacity used for arithmetic operation(s) and an operation processor for executing the arithmetic operation.

One embodiment is directed to a method that may include a network node signaling a configuration for possible GUL subframes to at least one UE. According to an embodiment, the method may also include signaling a configuration for determining the additional restrictions for GUL subframes. In certain embodiments, the configuration for determining when GUL transmission is not allowed may include at least one of the same subframe as a scheduled UL transmission, may be in the previous and the same subframe as a scheduled UL transmission, may be in m subframes following a scheduled UL transmission, where the value of m could be either predetermined or configurable variable, and/or may be in m subframes following a correctly received scheduled UL transmission, where the value of m could be either predetermined (fixed in the standards) or configurable variable.

Another embodiment is directed to an apparatus that may include at least one processor and at least one memory including computer program code. The at least one memory and the computer program code may be configured, with the at least one processor, to cause the apparatus at least to signal a configuration for possible GUL subframes to at least one UE. According to an embodiment, the at least one memory and the computer program code may be configured, with the at least one processor, to cause the apparatus at least to signal a configuration for determining the additional restrictions for GUL subframes. In certain embodiments, the configuration for determining when GUL transmission is not allowed may include at least one of the same subframe as a scheduled UL transmission, in the previous and the same subframe as a scheduled UL transmission, in m subframes following a scheduled UL transmission, where the value of m could be either predetermined or configurable variable, and/or in m subframes following a correctly received scheduled UL transmission, where the value of m could be either predetermined (fixed in the standards) or configurable variable.

Another embodiment is directed to a method that may include a UE receiving a configuration for possible GUL subframes from an eNodeB. In an embodiment, the configuration may be received via RRC signalling, for example as a bitmap where each bit set to "1" corresponds to a subframe where GUL transmissions may be allowed. Optionally, in an embodiment, the method may also include receiving a configuration for determining the additional restrictions for GUL subframes. In certain embodiments, the configuration for determining when GUL transmission is not allowed may include at least one of the same subframe as a scheduled UL transmission, in the previous and the same subframe as a scheduled UL transmission, in m subframes following a scheduled UL transmission, where the value of m could be either predetermined or configurable variable, and/or in m subframes following a correctly received scheduled UL transmission, where the value of m could be either predetermined (fixed in the standards) or configurable variable. In an embodiment, the method may also include determining that UL signals are scheduled to be transmitted in a subframe, and based on the received configuration for determining additional restrictions for GUL subframes, determining whether GUL transmission is allowed in that subframe, or subframes before or after that. In an alternative embodiment, the method may also include determining that a positive HARQ acknowledgement for a PUSCH transmission has been received in a subframe, and based on the received configuration for determining additional restrictions for GUL subframes, determining whether GUL transmission is allowed in subframes after that.

Another embodiment is directed to an apparatus that may include at least one processor and at least one memory including computer program code. The at least one memory and the computer program code may be configured, with the at least one processor, to cause the apparatus at least to receive a configuration for possible GUL subframes from an eNodeB. In an embodiment, the configuration may be received via RRC signalling, for example as a bitmap where each bit set to "1" corresponds to a subframe where GUL transmissions may be allowed. Optionally, in an embodiment, the at least one memory and the computer program code may be configured, with the at least one processor, to cause the apparatus at least to receive a configuration for determining the additional restrictions for GUL subframes. In certain embodiments, the configuration for determining when GUL transmission is not allowed may include at least one of the same subframe as a scheduled UL transmission, in the previous and the same subframe as a scheduled UL transmission, in m subframes following a scheduled UL transmission, where the value of m could be either predetermined or configurable variable, and/or in m subframes following a correctly received scheduled UL transmission, where the value of m could be either predetermined (fixed in the standards) or configurable variable. In an embodiment, the apparatus may also be controlled to determine that UL signals are scheduled to be transmitted in a subframe, and based on the received configuration for determining additional restrictions for GUL subframes, determine whether GUL transmission is allowed in that subframe, or subframes before or after that. In an alternative embodiment, the apparatus may also be controlled to determine that a positive HARQ acknowledgement for a PUSCH transmission has been received in a subframe, and based on the received configuration for determining additional restrictions for GUL subframes, determine whether GUL transmission is allowed in subframes after that.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

What is claimed is:

1. A method, comprising:
   receiving a first configuration for grantless uplink subframes from a network node via radio resource control signaling as a bitmap indicating for one or more subframes whether or not grantless uplink transmissions is allowed;
   receiving a second configuration for determining restrictions for grantless uplink subframes that are additional to those received in the first configuration; and
   determining from the received second configuration when grantless uplink transmission is not allowed for at least one grantless uplink subframe,
   wherein the determining further comprises
      determining that uplink signals are scheduled to be transmitted in a subframe; and
      determining whether grantless uplink transmission is allowed in the subframe, or subframes before or after the subframe.

2. The method as in claim 1, wherein the second configuration indicates that the grantless uplink transmission is not allowed in at least one of the following: in a same subframe as a scheduled uplink transmission and in a previous and the same subframe as the scheduled uplink transmission.

3. The method as in claim 1, wherein the second configuration indicates that the grantless uplink transmission is not allowed in at least one of the following: in m subframes following a scheduled uplink transmission and in m subframes following a correctly received scheduled uplink transmission, where value of m is either a predetermined or a configurable variable.

4. The method as in claim 1, wherein the determining further comprises:
   determining that a positive hybrid automatic retransmission request acknowledgement for a physical uplink shared channel transmission has been received in a subframe; and
   determining whether grantless uplink transmission is allowed in subframes after the subframe.

5. The method as in claim 1, wherein the second configuration received from the network node is channel specific, such that grantless uplink transmission not allowed is separately configured for scheduled and semi-persistent scheduled physical uplink shared channel transmissions.

6. The method as in claim 1, wherein the second configuration received from the network node is carrier or cell group specific, such that scheduled transmissions on some carriers result in grantless uplink transmissions to be allowed, whereas scheduled transmissions on some other carriers result in grantless uplink transmissions to be not allowed.

7. An apparatus, comprising:
at least one processor; and
at least one memory including computer program instructions,
wherein the at least one memory and computer program instructions are configured to, with the at least one processor, cause the apparatus at least to:
receive a first configuration for grantless uplink subframes from a network node via radio resource control signaling as a bitmap indicating for one or more subframes whether or not grantless uplink transmissions is allowed;
receive a second configuration for determining restrictions for grantless uplink subframes that are additional to those received in the first configuration; and
determine from the received second configuration when grantless uplink transmission is not allowed for at least one grantless uplink subframe,
wherein the at least one memory and computer program instructions are further configured, with the at least one processor, to cause the apparatus, when determining when grantless uplink transmission is not allowed, at least to:
determine that uplink signals are scheduled to be transmitted in a subframe; and
determine whether grantless uplink transmission is allowed in the subframe, or subframes before or after the subframe.

8. The apparatus as in claim 7, wherein the second configuration indicates that the grantless uplink transmission is not allowed in at least one of the following: in a same subframe as a scheduled uplink transmission and in a previous and the same subframe as the scheduled uplink transmission.

9. The apparatus as in claim 7, wherein the second configuration indicates that the grantless uplink transmission is not allowed in at least one of the following: in m subframes following a scheduled uplink transmission and in m subframes following a correctly received scheduled uplink transmission, where value of m is either a predetermined or a configurable variable.

10. The apparatus as in claim 7, wherein the at least one memory and computer program instructions are further configured to, with the at least one processor, cause the apparatus to determine when grantless uplink transmission is not allowed, at least to:
determine that a positive hybrid automatic retransmission request acknowledgement for a physical uplink shared channel transmission has been received in a subframe; and
determine whether grantless uplink transmission is allowed in subframes after the subframe.

11. The apparatus as in claim 7, wherein the second configuration received from the network node is channel specific, such that grantless uplink transmission not allowed is separately configured for scheduled and semi-persistent scheduled physical uplink shared channel transmissions.

12. The apparatus as in claim 7, wherein the second configuration received from the network node is carrier or cell group specific, such that scheduled transmissions on some carriers result in grantless uplink transmissions to be allowed, whereas scheduled transmissions on some other carriers result in grantless uplink transmissions to be not allowed.

13. An apparatus, comprising:
at least one processor; and
at least one memory including computer program instructions,
wherein the at least one memory and computer program instructions are configured to, with the at least one processor, cause the apparatus at least to:
signal a first configuration for grantless uplink subframes to at least one user equipment via radio resource control signaling as a bitmap indicating for one or more subframes whether or not grantless uplink transmissions is allowed; and
signal a second configuration for the user equipment to determine restrictions regarding when grantless uplink transmission is not allowed that are additional to those signaled in the first configuration,
wherein the grantless uplink transmission not allowed depends on at least one of the following: whether the grantless uplink transmission occupies whole carrier or not, and whether the grantless uplink transmission coincides with uplink subframes in a transmission opportunity on an unlicensed carrier.

14. The apparatus as in claim 13, wherein the second configuration indicates that the grantless uplink transmission is not allowed in at least one of the following: in a same subframe as a scheduled uplink transmission and in a previous and the same subframe as the scheduled uplink transmission.

15. The apparatus as in claim 13, wherein the second configuration indicates that the grantless uplink transmission is not allowed in at least one of the following: in m subframes following a scheduled uplink transmission and in m subframes following a correctly received scheduled uplink transmission, where value of m is either a predetermined or a configurable variable.

16. The apparatus as in claim 13, wherein the second configuration signaled from the apparatus is channel specific, such that grantless uplink transmission not allowed is separately configured for scheduled and semi-persistent scheduled physical uplink shared channel transmissions.

17. The apparatus as in claim 13, wherein the second configuration signaled from the apparatus is carrier or cell group specific, such that scheduled transmissions on some carriers result in grantless uplink transmissions to be allowed, whereas scheduled transmissions on some other carriers result in grantless uplink transmissions to be not allowed.

* * * * *